Patented Oct. 28, 1952

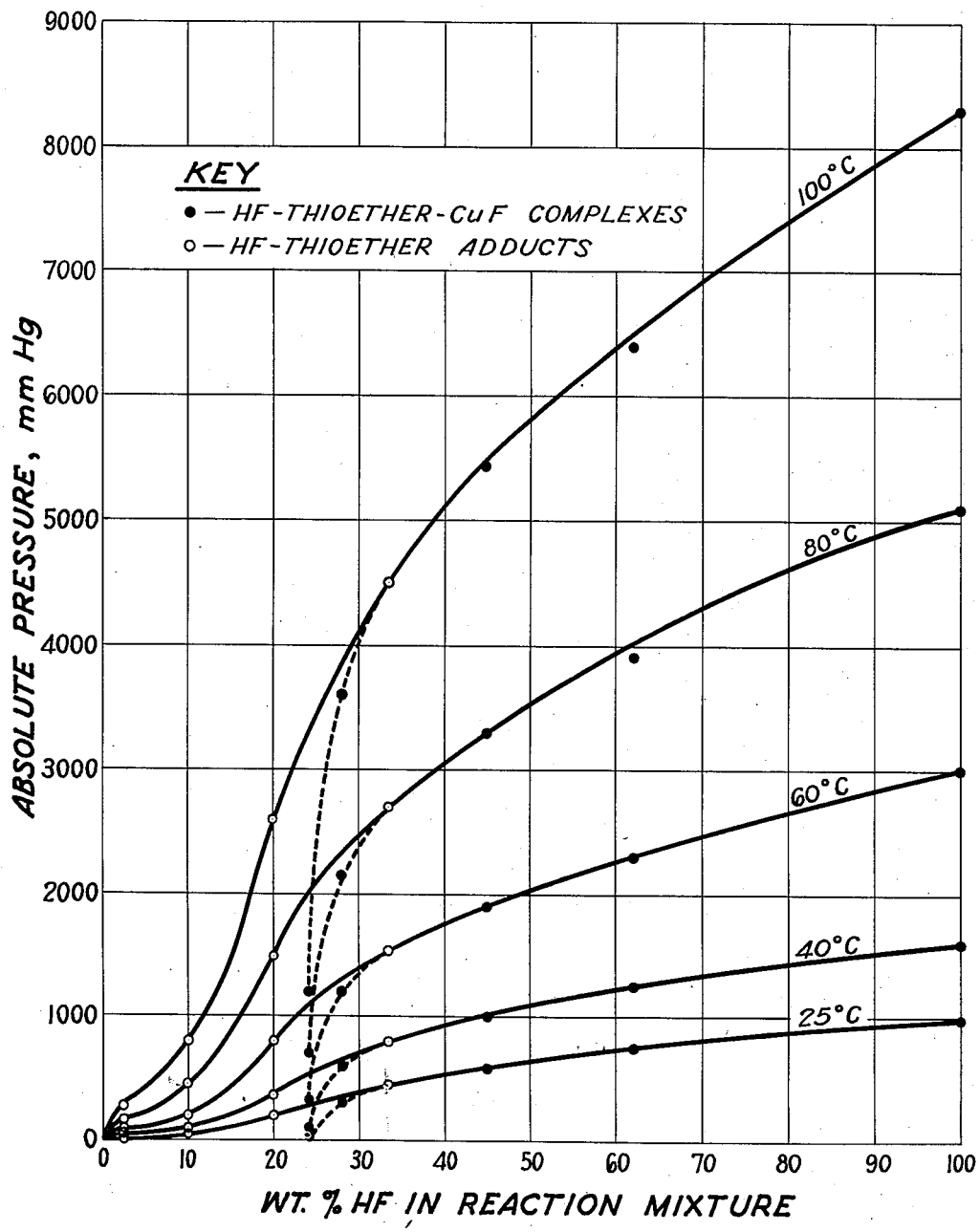

2,615,908

UNITED STATES PATENT OFFICE 2,615,908

THIOETHER-HF-COPPER COMPLEX COMPOUNDS

David A. McCaulay, Chicago, Ill., and Arthur P. Lien, Hammond, Ind., assignors to Standard Oil Company, Chicago, Ill., a corporation of Indiana Application July 19, 1950, Serial No. 174,618

20 Claims. (Cl. 260—438)

This invention relates to novel complex compounds, to a process by which they can be produced and to certain applications thereof.

It is an object of our invention to provide novel compounds derived from certain thioethers, HF and copper. Another object of our invention is to provide a process for the synthesis of said new compounds. Still another object is to provide an improved process for the removal of certain thioethers or their precursors from hydrocarbon oils while preparing novel complex compounds derived from said thioethers, HF and copper or a cuprous salt. An additional object is to provide uses and applications for the novel and complex chemical compounds synthesized by the process of the present invention. These and other objects of our invention will become apparent from the ensuing description thereof.

Briefly, we have made the unexpected discovery that saturated hydrocarbon thioethers react readily and smoothly with hydrogen fluoride and metallic copper or a cuprous salt, particularly cuprous fluoride, over an extremely wide temperature range to produce complex compounds having the molecular composition, 3AS.3HF.CuF, in which AS represents a saturated hydrocarbon thioether and HF and CuF have their ordinary chemical meaning. The molecular formula of the novel complex compounds is

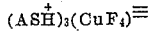

and the structural formula would appear to be

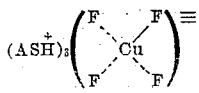

wherein

represents a sulfonium ion derived by addition of a proton to a thioether, the dotted linkages between Cu and F represent Werner-type secondary valence bonds, while the solid line linking Cu and F represents the ordinary covalent linkage. The complex compounds of this invention are clear, water-white, HF-miscible liquids in which the HF is so firmly bound that the complex compounds can be stored in Pyrex glass at room temperature without noticeable etching. The present invention will be described in considerably greater detail hereinafter.

A considerable variety of saturated hydrocarbon thioethers can be employed for the production of novel complex compounds in accordance with the present invention. The saturated hydrocarbon radicals in the thioethers may be alkyl or cycloalkyl radicals, or the thioethers may be a saturated heterocycle as in thiacyclopentane, thiacyclohexane, 2-methyl thiacyclopentane and the like. Because of their commercial availability and the ease with which they may be prepared, we ordinarily prefer to employ dialkyl sulfides or thioethers for preparative purposes in the present invention. Thus, we may employ dialkyl sulfides in which both alkyl groups can be the same or different and may, for example, be methyl, ethyl, n-propyl, isopropyl, n-butyl, isobutyl, t-butyl, amyls, octyls, decyls, dodecyls, hexadecyls, octadecyls and the like. The saturated hydrocarbon radical attached to the sulfur atom of the thioether may be substituted by aromatic radicals, for example as in benzyl thioether, 1- or 2-phenethyl thioether, benzyl ethyl thioether and the like. We may also employ mixtures of symmetrical thioethers and/or asymmetrical thioethers. An example of a symmetrical thioether is diethyl thioether and of an asymmetrical thioether is ethyl methyl thioether.

Thioethers may also be employed in mixtures containing other sulfur compounds, for example, as produced by various processes for the extraction of sulfur compounds from petroleum. For example, we may employ mixtures of sulfur compounds containing thioethers obtained by the extraction of various sulfur-containing petroleum fractions with liquid hydrogen fluoride.

It is well known that in the presence of liquid hydrogen fluoride and at temperatures within the range of those employed in synthesizing the novel compounds of the present invention, certain sulfur compounds are convertible to saturated hydrocarbon thioethers and can, thus, be employed for our purposes. Thus, for example, tertalkyl mercaptans, for example t-butyl mercaptan and t-dodecyl mercaptan, are converted in substantial proportion by liquid hydrogen fluoride at ordinary temperatures to H₂S and t-alkyl thioethers. Similarly, a mixture of a n-alkyl mercaptan and a t-alkyl mercaptan reacts to produce an asymmetrical thioether and H₂S. Mercaptans and olefins also react in the presence of liquid HF at ordinary temperatures to produce thioethers. Benzyl mercaptan reacts readily to produce benzyl thioether. (A. P. Lien, D. A. McCaulay and B. L. Evering, Ind. Eng. Chem. 41, 2700-1 (December 1949)).

Although not essential to the practice of the present invention, diluents and solvents which are substantially immiscible with liquid hydrogen fluoride under the reaction conditions can be employed in preparing the novel complex compounds of the present invention. Suitable diluents are saturated and/or monocyclic aromatic hydrocarbons, substantially unreactive chlorinated solvents such as carbon tetrachloride, symmetrical tetrachloroethane and the like. When the preparative process of the present invention is employed upon a thioether-containing petroleum fraction as the charging stock, the hydrocarbons of said stock function as a reaction diluent and the preparative process results in substantial desulfurization of said stock, in excess of the amount of desulfurization that would have been obtained by extraction of said stock only with liquid hydrogen fluoride. In a variant of the process, a thioether-containing petroleum stock can first be extracted with between about 0.1 and about 2 volumes of liquid hydrogen fluoride at temperatures between about 0° F. and about 150° F. under pressure sufficient to maintain the liquid phase and the resultant extract can be treated with metallic copper or a cuprous salt to produce the novel complex compounds of the present invention.

The stabilities of the complex compounds produced by the process of the present invention are so great and the free energy of the preparative reaction so large that even metallic copper in sheet or plate form reacts with HF and a saturated hydrocarbon thioether even at 0° C. to form molecular hydrogen and cuprous fluoride and the cuprous fluoride, HF and saturated hydrocarbon thioether then combine to produce a complex compound. It should be noted that in the presence of HF alone or the thioether alone, copper remains unattacked at 0° C. It will be apparent that copper granules, dust, powder, chips, pellets, shavings and the like can be employed in lieu of copper plates. It will also be apparent that the platings or other coatings of copper on HF-resistant materials such as structural carbon, low carbon steels and the like can be employed.

Although cuprous salts, in general, may be employed in the preparative process, we usually desire to employ cuprous salts of relatively volatile acids such as the halogen acids, particularly cuprous fluoride, cuprous nitrate and cuprous salts of the $C_1$—$C_4$ fatty acid series. The preferred forms of copper for employment in the present process are metallic copper and cuprous fluoride.

Gaseous or liquid hydrogen fluoride may be employed for the preparative process, preferably in substantially anhydrous condition. We prefer to employ commercial liquid substantially anhydrous hydrogen fluoride. Although the proportion of hydrogen fluoride may conform to the stoichiometric ratio (3 mols of HF per mol of cuprous copper and 1 mol of HF per mol of saturated hydrocarbon thioether), it is desirable to employ a substantial molar excess of liquid hydrogen fluoride, since it functions as a solvent for the complex compound produced by the reaction. The excess liquid hydrogen fluoride may be removed from the solution by distillation at reduced pressures following the reaction. The reaction can also be performed in the presence of liquid or gaseous inert diluents, for example hydrocarbon diluents.

The reaction of complex formation proceeds readily over a considerable temperature range. Thus, the complex-forming reaction can be effected at temperatures between about 0 and about 120° F. although even somewhat higher or lower temperatures may be employed. At lower temperatures the reaction rate may be reduced somewhat, while at higher temperatures some decomposition of the complex compound with loss of HF vapor is encountered. The reaction proceeds with ease at or about room temperature and ordinarily it is commercially convenient to carry out the reaction at temperatures about 30 and about 85° F.

When the preparative method involves the use of liquid hydrogen fluoride, it will be necessary to employ a reaction pressure sufficient to maintain a liquid hydrogen fluoride phase. Ordinarily, the reaction can be effected at atmospheric or slightly elevated pressures; for example 50 up to about 100 p. s. i. a. are suitable.

The following operating examples are intended to illustrate but not necessarily to delimit the present invention.

EXAMPLE 1

Apparatus was assembled for the purpose of preparing saturated hydrocarbon thioether-HF-copper complexes and also for measuring the vapor pressure thereof. The assembly comprised a copper manifold to which were connected a 500 ml. magnetically stirred copper flask which functioned as the reactor, a 1200 ml. copper flask used for metering HF, an open-end mercury manometer connected to the copper manifold between the reactor and metering flask through commercial polyethylene tubing, a 30 inch vacuum-30 p. s. i. g. pressure gauge connected to the copper manifold and valved lines connecting the copper manifold to a vacuum pump and a cylinder of commercial, substantially anhydrous hydrogen fluoride.

A 137 g. sample of diethyl sulfide was placed in the 500 ml. reaction flask and the latter connected to the vacuum system. The flask was immersed in a liquid nitrogen bath, the whole system evacuated, and the valve to the reaction flask closed. Hydrogen fluoride gas was then passed into the system from the storage cylinder and allowed to fill the metering flask. The valve of the vapor pressure flask was opened and an increment of HF was condensed in the reaction flask. After several increments had been added in this manner and any non-condensable gas present in the HF had been pumped off, the valve of the metering flask was closed and the reaction (vapor pressure) flask allowed to warm to 0° C. in an ice-water bath. After a reading at this temperature was taken, the reaction flask was placed in a 23° C. bath and another pressure reading was taken. The contents of the flask were then frozen down in liquid nitrogen and another increment of HF added. This cycle was repeated until the HF concentration was about 65 weight percent of the HF-$Et_2S$ mixture. Free HF was distilled off at room temperature from the reaction mixture under vacuum until the vapor pressure of the mixture (complex compound) remaining in the reaction flask was 6 mm. at 0° C. and the complex compound was then titrated with standard NaOH to a phenolphthalein end point showing that it contained 22.7 weight percent HF which is the equivalent of 1⅓ mols of HF per mol of diethyl thioether. CuF titrates as an acid with NaOH. During the titration a yellow-orange precipitate was formed which was identified as cuprous oxide. From the weight of the precipitate and from the loss in weight of the copper reaction flask, it was determined that about 1 mol of copper was present for every 3 mols of diethyl thioether. It appears, therefore, that the complex compound contains 1 mol of cuprous fluoride, 3 mols of HF and 3 mols of diethyl sulfide and that its structural formula could be

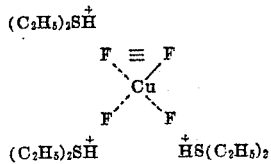

and its molecular formula

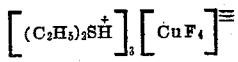

The overall reaction between copper, HF, and ethyl sulfide would then be,

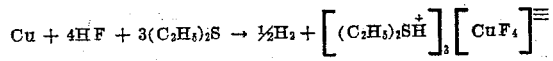

EXAMPLE 2

A sulfur-containing gas oil boiling range catalytic cracking charging stock was continuously and countercurrently extracted with 30 volume percent of liquid hydrogen fluoride at 100° F. and 85 p. s. i. g. to produce an HF extract phase containing approximately 60 weight percent of HF and 6 percent sulfur (based on hydrocarbon portion of extract). The properties of the charging stock were as follows:

| | |
|---|---|
| Wt. Percent Sulfur | 1.87 |
| Bromine No | 22.9 |
| Copper No | 23.7 |
| A. P. I. Gravity | 26.1 |

| A. S. T. M. Distillation | °F. |
|---|---|
| I. B. P | 410 |
| 10 | 496 |
| 20 | 544 |
| 30 | 576 |
| 40 | 610 |
| 50 | 636 |
| 60 | 662 |
| 70 | 686 |
| 80 | 707 |
| 90 | 719 |
| Max | 722 |

The properties of HF extract (HF-free) were as follows:

| | |
|---|---|
| A. P. I. Gravity | 7.2 |
| Wt. Percent Sulfur | 6 |

| A. S. T. M. Distillation | °F. |
|---|---|
| 30 | 480 |
| I. B. P | 548 |
| 10 | 635 |
| 50 | 692 |
| 70 | 723 |
| Max | 739 |

The HF extract phase was treated with metallic copper at 20–25° C. for 4 days to produce complexes of thioethers, HF and copper. Vapor pressure measurements were made of the solution of the resultant complex compounds in liquid hydrogen fluoride by the use of a 1570 ml. carbon steel autoclave fitted with a 1725 R. P. M. mechanical stirrer, a mercury manometer and a 20 inch vacuum–30 p. s. i. pressure gauge for the low pressure range and a 0–2000 p. s. i. pressure gauge for the high pressure range. A sample of the reaction mixture containing excess liquid HF (about 1200 ml. in all) was charged to the autoclave, the mixture stirred at the desired temperature for one hour, and the pressure recorded. The temperature was raised to a higher value, the mixture stirred and the pressure again recorded. This process was repeated several times until the desired temperature range had been covered. A sample (about 10 ml.) of the liquid phase was then withdrawn and titrated to a phenolphthalein end point with standard NaOH. Next, a portion of the HF was removed by allowing it to distill from the autoclave at room temperature into a dry-ice-cooled flask. This entire cycle was repeated several times until the vapor pressure of HF became too low for room temperature distillation at a reasonable rate. The following data were obtained.

*Table 1*

| Wt. Percent HF in Reaction Mixture | Temp., ° C. | Pressure in mm. Hg abs. |
|---|---|---|
| 62.3 | 24 | 696 |
|  | 38 | 1,140 |
|  | 52 | 1,810 |
|  | 66 | 2,720 |
| 45.3 | 22 | 465 |
|  | 38 | 916 |
|  | 52 | 1,435 |
|  | 66 | 2,160 |
| 27.9 | 21 | 291 |
|  | 38 | 570 |
|  | 52 | 946 |
|  | 66 | 1,226 |
| 24.0 | 25.5 | 51 |
|  | 54.5 | 279 |
|  | 73 | 554 |
|  | 100 | 1,045 |

A graphical correlation of weight percent HF in the reaction mixture versus pressure at various temperatures is presented in the annexed figure. It will be noted from the figure that at concentrations of HF in the reaction mixture below about 35 weight percent there is a sharp reduction in vapor pressure which approaches 0 pressure at about 20–25 weight percent HF. This indicates the formation of copper-HF-thioether complexes which have far lower vapor pressures than the simple HF-sulfur compound adducts. Vapor pressure data are also shown in the figure for HF-sulfur extract which has not been complexed with copper. It will be noted that the vapor pressure of the HF-sulfur compound adducts approaches zero as the HF concentration approaches zero.

It will be apparent from the data that at 175° F. (80° C.) and higher temperatures the complexes of copper-HF-thioethers are relatively unstable and exert fairly high partial pressures.

It will be apparent from the foregoing description of the preparative process of the present invention that it not only has utility per se, that is to say, as a preparative method, but that both the preparative method and the products may be applied in various useful ways. Thus, the present preparative method can be employed for the removal of copper salts remaining in gasoline or heater oil from copper salt sweetening process, or remaining therein as a consequence of sweetening said oils by air-blowing in the presence of caustic and copper. The presence of traces of copper is undesirable, for example in heater oil, because of impaired color as well as the formation of gum. To remove copper from a copper-containing hydrocarbon oil, liquid HF is added together with a suitable saturated hydrocarbon thioether, and the resultant solution of complex compound in excess liquid HF can be readily separated from the substantially immiscible treated hydrocarbon oil. In some instances it will be necessary to add little or no thioether, since the copper-containing hydrocarbon oil may contain the same in desired quantity. The resulting thioether-HF-CuF complex can be heated to temperatures within the range of about 170 to about 500° F., usually about 250 to about 350° F. to regenerate hydrogen fluoride, which can be recycled to the process.

It will, likewise, be apparent that the novel preparative process of the present invention can also be applied as a means of removing HF, especially in trace quantity, from HF-containing gas or liquid streams, for example from vent gases from an HF petroleum extraction plant, from an HF alkylation plant, from an HF cracking plant or the like. Thus, the HF-containing stream can be contacted with a slurry of powdered copper or CuF and a saturated hydrocarbon thioether to produce a stable complex, from which HF may be regenerated by thermal treatment and recycled for use in the original process from which it was derived.

Still another application of the present preparative process is to improve known processes of HF extraction of hydrocarbon oils, particularly to improve processes for the HF extraction of sulfur-containing petroleum oils. The addition of metallic copper or a copper salt, particularly CuF, in these processes aids and improves the extraction process through the formation of stable 3AS.3HF.CuF complexes. It will be apparent that the addition of only 1 mol of cuprous copper is sufficient to effect the substantially quantitative removal of 3 mols of hydrocarbon thioether from the thioether-containing hydrocarbon oil undergoing treatment.

It will be apparent that the novel preparative method of the present invention can also be employed as a means of scavenging copper from copper-coated or copper-electroplated articles, for example, copper mirrors and the like, as well as for etching copper or brass articles to obtain desired surface effects. Copper catalysts for hydrogenation, etc. may be etched by applying HF and a saturated hydrocarbon thioether thereto in order to increase their catalytic activity.

In view of the stability of the novel complex compounds of the present invention, it will be apparent that they may be employed as a means of storing hydrogen fluoride at low pressure, the hydrogen fluoride being released by thermal decomposition of the complex whenever and wherever it is desired to employ free HF. The thioether-CuF-HF complexes can be employed as latent catalysts for a considerable variety of reactions which are known to be catalyzed by free HF, the reaction conditions being adjusted to permit at least partial decomposition of the complex to liberate free HF. The employment of the novel complex compounds of the present invention affords an advantage in that the free HF concentration in the reaction zone is automatically buffered by their employment so that catalytic activity remains constant and undesirable side reactions induced by excessively high free HF concentrations can be avoided. In addition, the copper content of the complex can, in some instances, exert promoting catalytic effects on the HF, for example in alkylation and polymerization reactions.

The novel complex compounds of the present invention afford a highly desirable glass etching medium from which HF can be evolved at the desired rate by raising the temperature and, when the etching is completed, HF evolution can be stopped sharply merely by lowering the temperature.

Having thus described our invention, what we claim is:

1. A complex compound having the molecular composition 3AS.3HF.CuF in which AS is a saturated hydrocarbon thioether.

2. A liquid hydrogen fluoride solution of a complex compound having the molecular composition 3AS.3HF.CuF in which AS is a saturated hydrocarbon thioether.

3. A complex compound having the molecular composition $3(C_2H_5)_2S.3HF.CuF$.

4. A process for the preparation of a compound having the molecular composition 3AS.3HF.CuF in which AS is a saturated hydrocarbon thioether, which process comprises contacting said hydrocarbon thioether with a source of copper selected from the class consisting of metallic copper and a cuprous salt and with hydrogen fluoride, and separating said compound from the reaction mixture.

5. A process for the preparation of a compound having the molecular composition 3AS.3HF.CuF in which AS is a saturated hydrocarbon thioether, which process comprises contacting said hydrocarbon thioether with about an equimolar proportion of copper derived from a source of copper selected from the class consisting of metallic copper and cuprous salts and with liquid hydrogen fluoride in substantial excess of the stoichiometric proportion at a temperature between about 0° F. and about 120° F., and separating a liquid hydrogen fluoride solution of said compound.

6. The process of claim 5 wherein the source of copper is metallic copper.

7. The process of claim 5 wherein the source of copper is a cuprous salt.

8. The process of claim 5 wherein the source of copper is a cuprous salt of a volatile acid.

9. The process of claim 5 wherein the source of copper is a cuprous halide.

10. The process of claim 5 wherein the source of copper is cuprous fluoride.

11. A process for the preparation of a compound having the molecular composition 3AS.3HF.CuF wherein AS is a dialkyl thioether, which process comprises contacting said dialkyl thioether with about an equimolar proportion of cuprous fluoride and with liquid hydrogen fluoride in substantial excess of the stoichiometric proportion at a temperature between about 0° F. and about 120° F. and separating a liquid hydrogen fluoride solution of said compound.

12. A process for the preparation of a compound having the molecular composition 3AS.3HF.CuF wherein AS is a dialkyl thioether, which process comprises contacting said dialkyl thioether with about an equimolar proportion of cuprous fluoride and with liquid hydrogen fluoride in substantial excess of the stoichiometric proportion at a temperature between about 0° F. and about 120° F., thereby producing a liquid hydrogen fluoride solution of said compound, and distilling free hydrogen fluoride from said solution at a temperature below the decomposition temperature of said compound.

13. The process of claim 4 wherein the source of copper is metallic copper.

14. The process of claim 4 wherein the source of copper is a cuprous salt.

15. The process of claim 4 wherein the source of copper is a cuprous salt of a volatile acid.

16. The process of claim 4 wherein the source of copper is a cuprous halide.

17. The process of claim 4 wherein the source of copper is cuprous fluoride.

18. The process of claim 4 wherein said contacting is effected at a temperature between about 0° F. and about 120° F.

19. The process of claim 4 wherein said saturated hydrocarbon thioether is a dialkyl thioether, said contacting is effected at a temperature between about 0° F. and about 120° F. and said source of copper is cuprous fluoride.

20. The process of claim 4 wherein said saturated hydrocarbon thioether is a dialkyl thioether, said contacting is effected at a temperature between about 0° F. and about 120° F. and said source of copper is metallic copper.

DAVID A. McCAULAY.
ARTHUR P. LIEN.

REFERENCES CITED

The following references are of record in the file of this patent:

UNITED STATES PATENTS

| Number | Name | Date |
| --- | --- | --- |
| 2,051,939 | Day | Aug. 25, 1936 |
| 2,199,944 | Van Peski et al. | May 7, 1940 |
| 2,343,841 | Burk | June 8, 1943 |
| 2,362,219 | Schulze et al. | Nov. 7, 1944 |

FOREIGN PATENTS

| Number | Country | Date |
| --- | --- | --- |
| 501,725 | Germany | June 1930 |

OTHER REFERENCES

Pfeiffer: Molekulverbindungen, 2nd edition, pgs. 158–164.

C. A., vol. 43, page 6049.